O. LIPPINCOTT.
Seed-Planter.
No. 20,074.
Patented Apr. 27. 1858
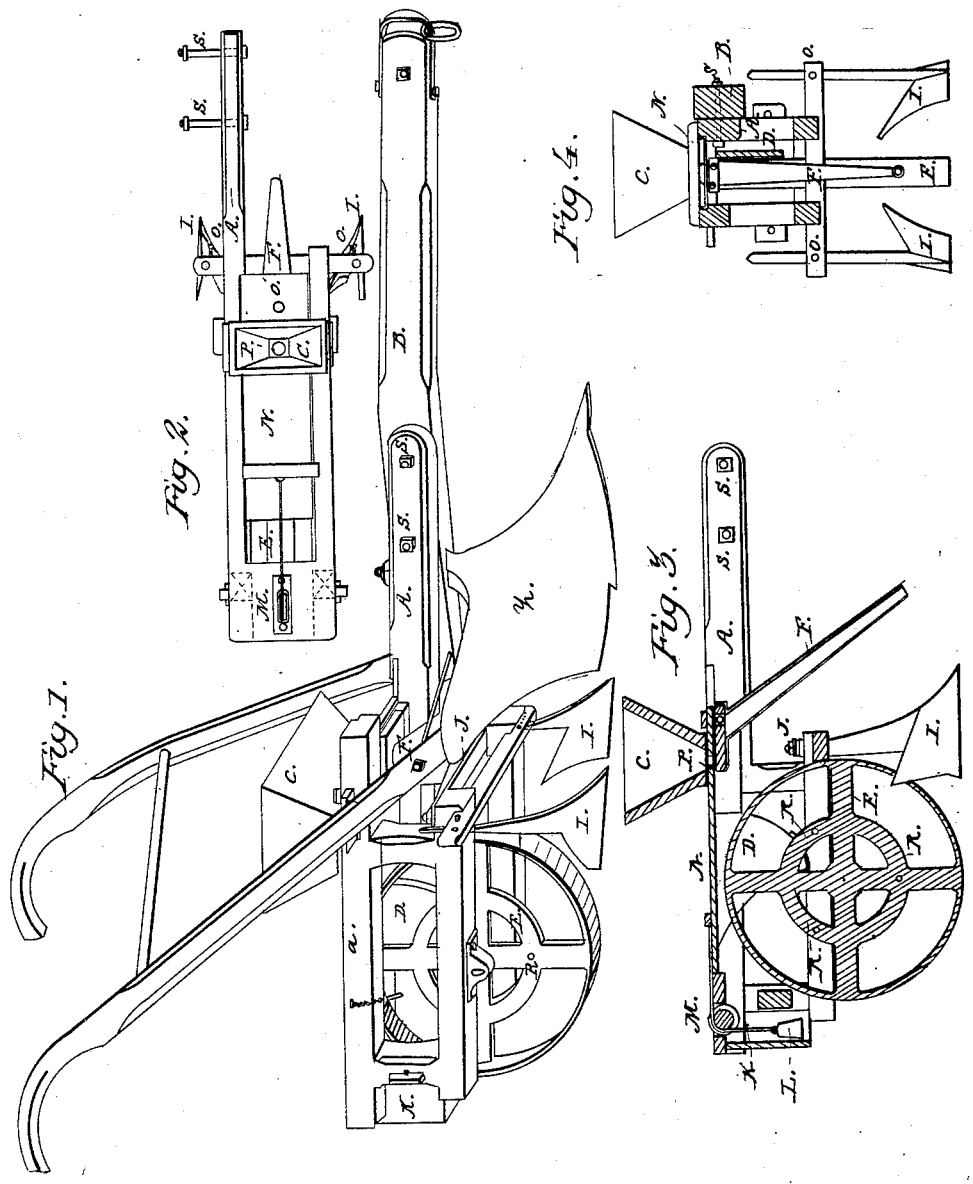

UNITED STATES PATENT OFFICE.

O. LIPPINCOTT, OF CAMDEN, NEW JERSEY.

IMPROVEMENT IN CORN-PLANTERS.

Specification forming part of Letters Patent No. 20,074, dated April 27, 1858.

*To all whom it may concern:*

Be it known that I, OLIVER LIPPINCOTT, of the city of Camden, Camden county, State of New Jersey, have invented a new and improved mode of plowing, planting, and covering corn at one and the same time; and I do hereby declare that the following is a full and exact description thereof, reference being had to the accompanying drawings, and to the letters of reference marked thereon.

The nature of my invention consists in the arrangement hereinafter shown for attaching a planting apparatus to plow Z, so that the farmer may plow, furrow, plant, and cover his corn at one and the same time.

No. 1 is a perspective view of planting apparatus connected to the plow, as shown. No. 2 is a plan of the top of the planting apparatus. No. 3 is a sectional view through the center of the planting apparatus. No. 4 is a front elevation. The frame A, which is attached to plow, is constructed with four horizontal beams mortised together at each end. On this frame are placed the slide, hopper, weight, cord and pulley, and a revolving wheel with pins, that strike an arm connected to the slide, and has also two coverers, which precede the wheel, for covering the grain that falls from seed-tube.

The hopper C contains the grain, and is operated in the following manner: When the plow is in motion the wheel E revolves, the adjustable pins R R R R R strike the sliding arm D, thereby moving the slide N forward, carrying the seed-cup P forward to the opening O', thereby discharging the seed into the tube F, which conducts the seed to the hill. On passing the pins R R R R R the slide-arm D is drawn back into its former position by means of the weight L and pulley M. The grain is discharged from tube F in advance of the adjustable coverers I I, which cover the seed. The two screws O O regulate the depth of the coverers I I. The bolt G, by holding forward the slide N, stops the discharge of seed and leaves the wheel E free to revolve. The inner side of the weight-box K acts as a scraper to clear the dirt from wheel E.

What I claim, and desire to secure by Letters Patent, is—

The arrangement of the plow Z and its beam B with frame A and its hopper C, weight L, slide N, wheel E, and covering-share I I, the whole arranged for joint operation as herein shown and described.

OLIVER LIPPINCOTT.

Witnesses:
WM. W. TURNER,
C. N. PARMILLEE.